J. T. HOHBERGER.
AUTOMATIC CREAM MACHINE.
APPLICATION FILED DEC. 24, 1912.
1,215,024.
Patented Feb. 6, 1917.
6 SHEETS—SHEET 1.
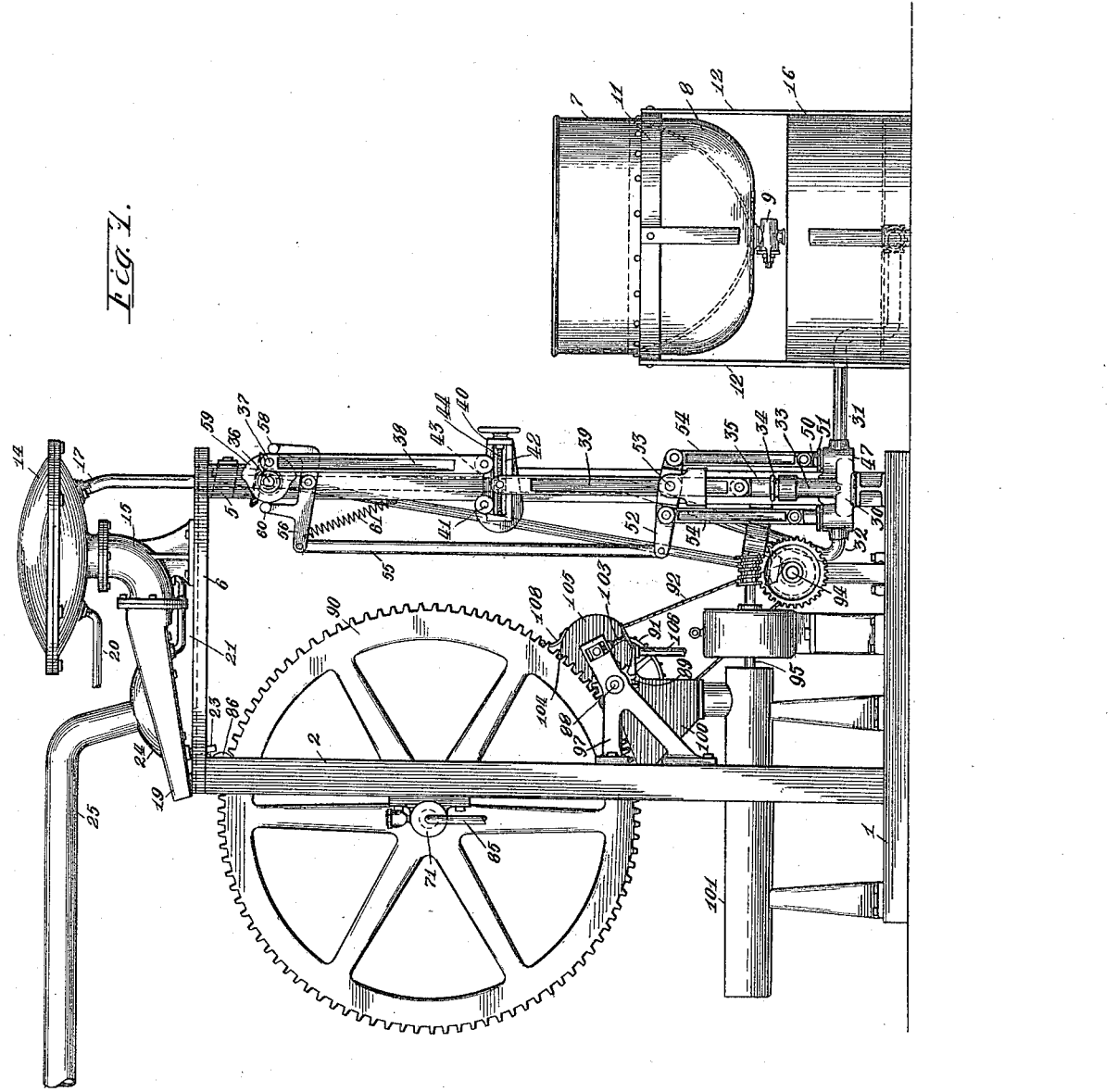
Witnesses:
R. L. Farrington
Blanche Chalmers
Inventor:
John T. Hohberger
By Burton J. Hills
Attorney.

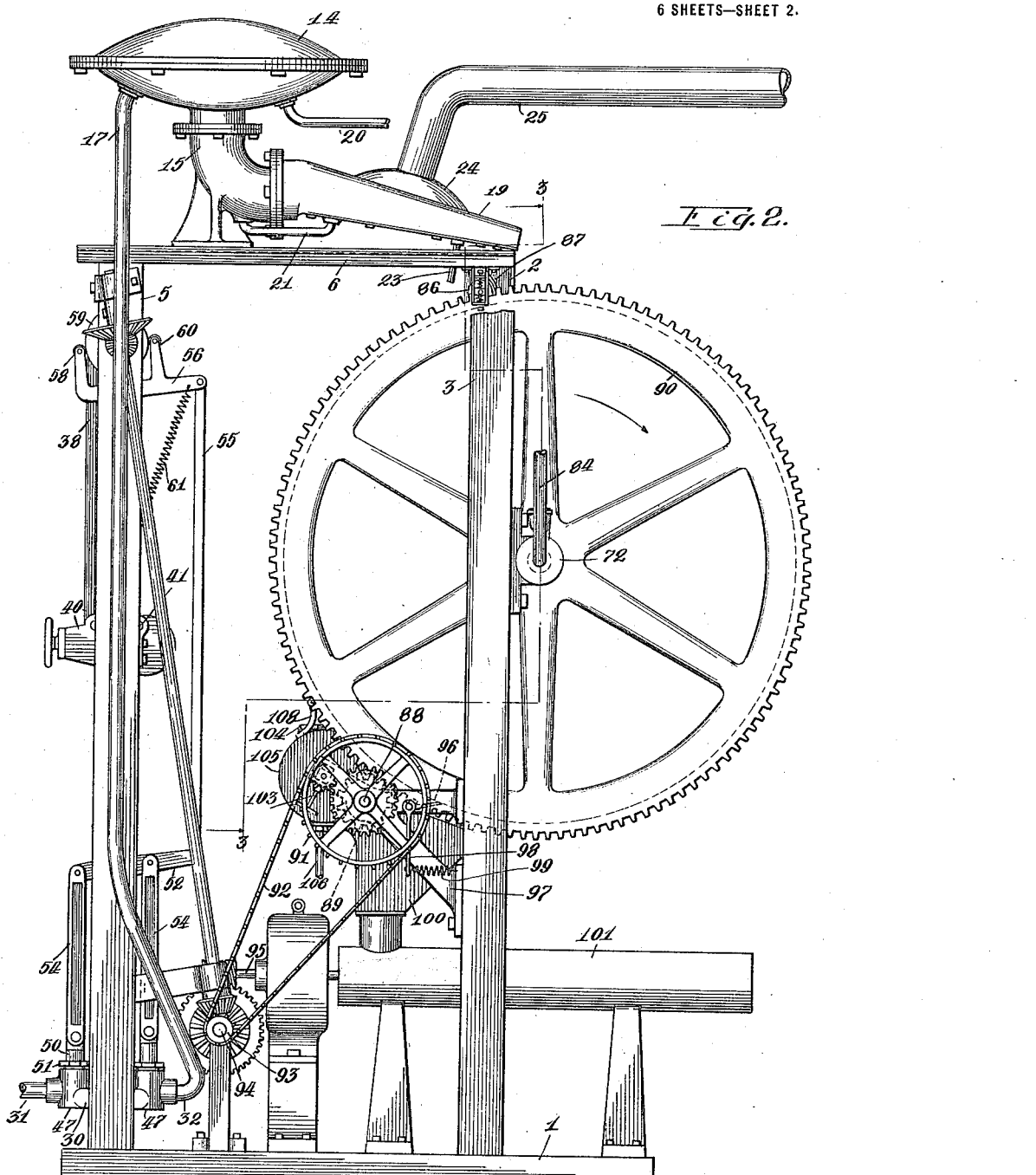

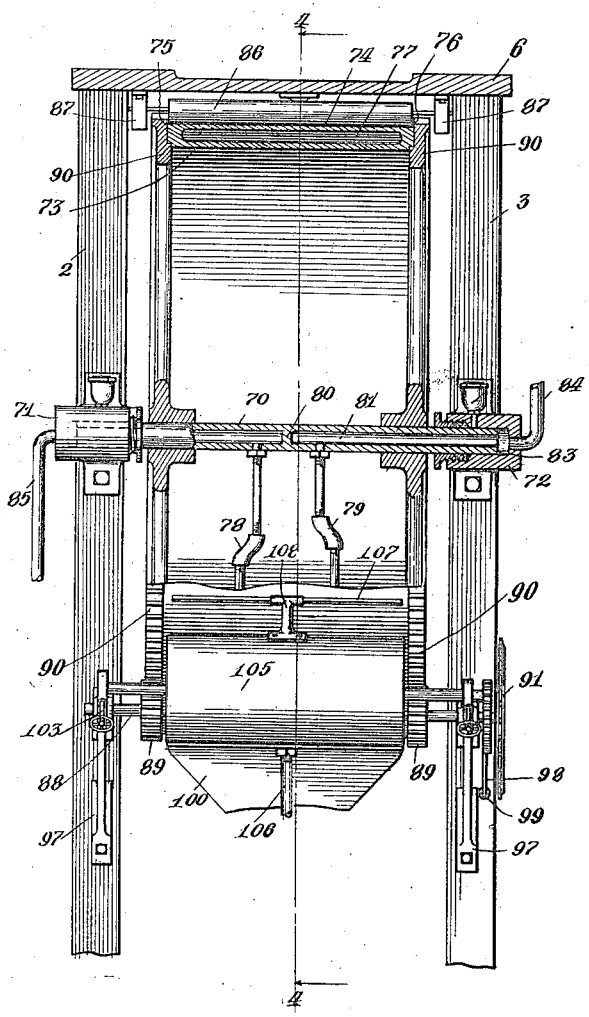

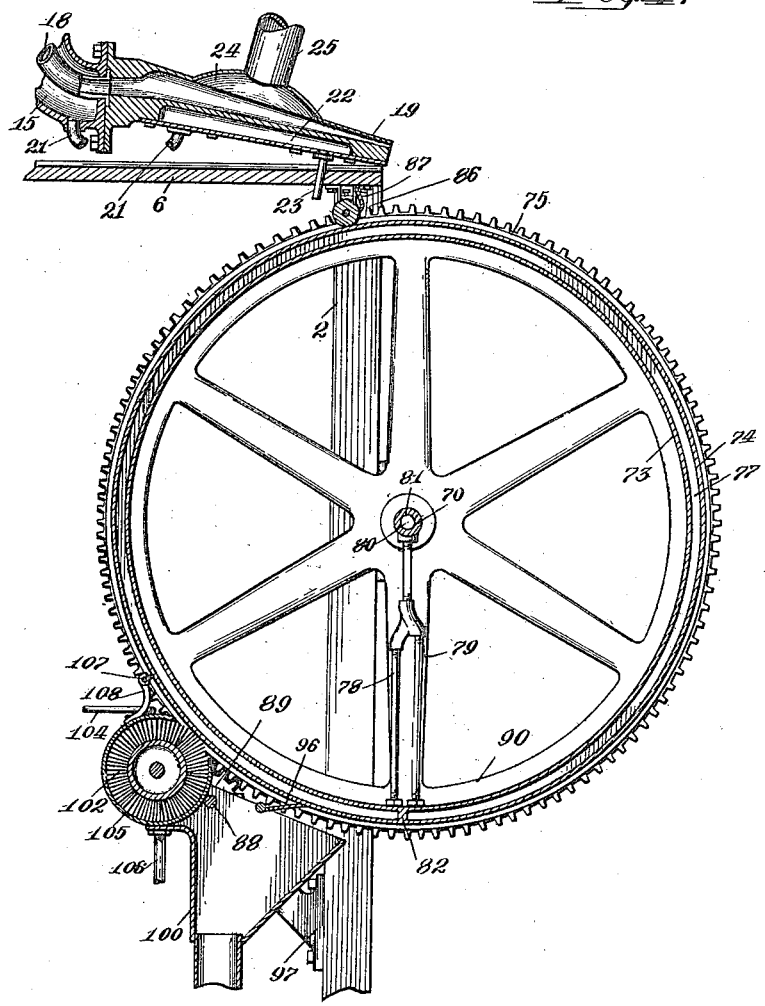

J. T. HOHBERGER.
AUTOMATIC CREAM MACHINE.
APPLICATION FILED DEC. 24, 1912.
1,215,024.
Patented Feb. 6, 1917.
6 SHEETS—SHEET 5.
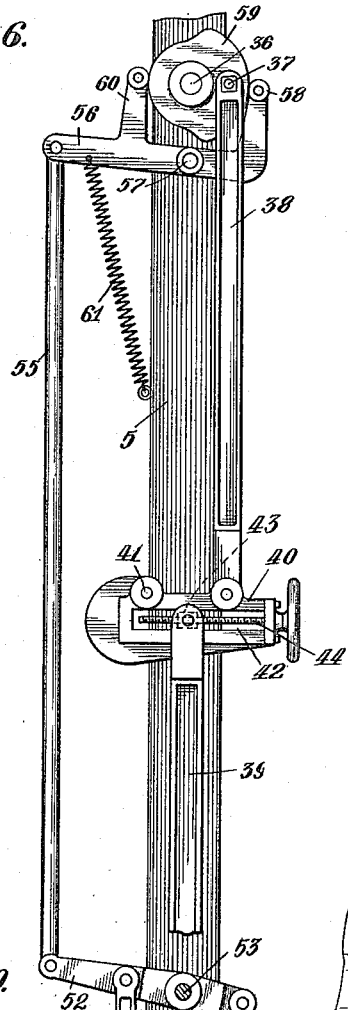
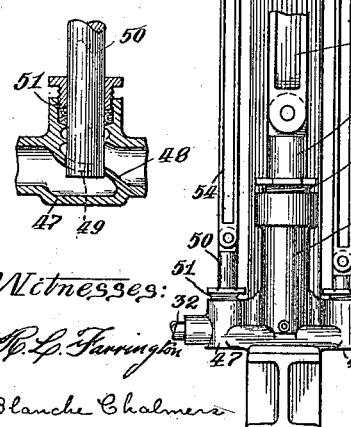
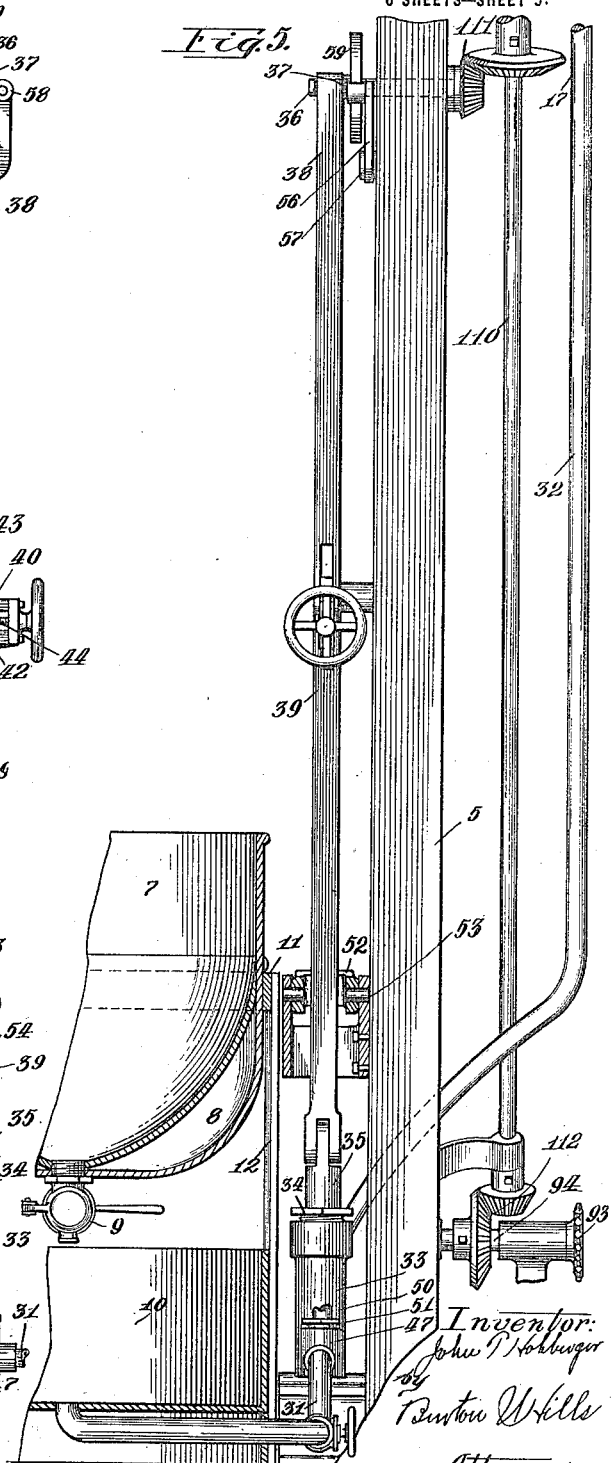
Witnesses:
R. L. Farrington
Blanche Chalmers
Inventor:
John T. Hohberger
by Burton & Wills
Attorney.

J. T. HOHBERGER.
AUTOMATIC CREAM MACHINE.
APPLICATION FILED DEC. 24, 1912.

1,215,024.

Patented Feb. 6, 1917.
6 SHEETS—SHEET 6.

Witnesses:
R. L. Farrington
Blanche Chalmers

Inventor:
John T. Hohberger
By Burton Hille
Attorney.

UNITED STATES PATENT OFFICE.

JOHN T. HOHBERGER, OF CHICAGO, ILLINOIS.

AUTOMATIC CREAM-MACHINE.

1,215,024.

Specification of Letters Patent. Patented Feb. 6, 1917.

Application filed December 24, 1912. Serial No. 738,439.

*To all whom it may concern:*

Be it known that I, JOHN T. HOHBERGER, a subject of the Emperor of Germany, residing at Chicago, in the county of Cook and State of Illinois, have invented certain new and useful Improvements in Automatic Cream-Machines, of which the following is a description.

My invention relates to mechanism for producing syrups, sugar cream, fondants and the like suitable for the manufacture of confection.

The object of my invention is to provide a simple, convenient and reliable device of the kind described, adapted to receive the properly proportioned raw materials and automatically operate upon the same and produce a finished product whereby a syrup, finished sugar-cream, fondant or the like may be made without further handling or manipulating after the initial mixing of the various materials required for producing the finished product.

To this end my invention consists in the novel construction, arrangement and combination of parts herein shown and described and more particularly pointed out in the claims.

In the accompanying drawings, wherein like or similar reference characters indicate like or corresponding parts:

Figure 1 is a side elevation of one form of my device.

Fig. 2 is a side elevation of the same from the side opposite to that shown in Fig. 1.

Fig. 3 is a section taken substantially on line 3—3 of Fig. 2.

Fig. 4 is a section taken substantially on line 4—4 of Fig. 3.

Fig. 5 is a detail end elevation of the feed pump of my device.

Fig. 6 is a detail side elevation of the feed pump and driving mechanism.

Fig. 9, is a fragmentary section showing a valve chamber of the pump.

Figure 7:
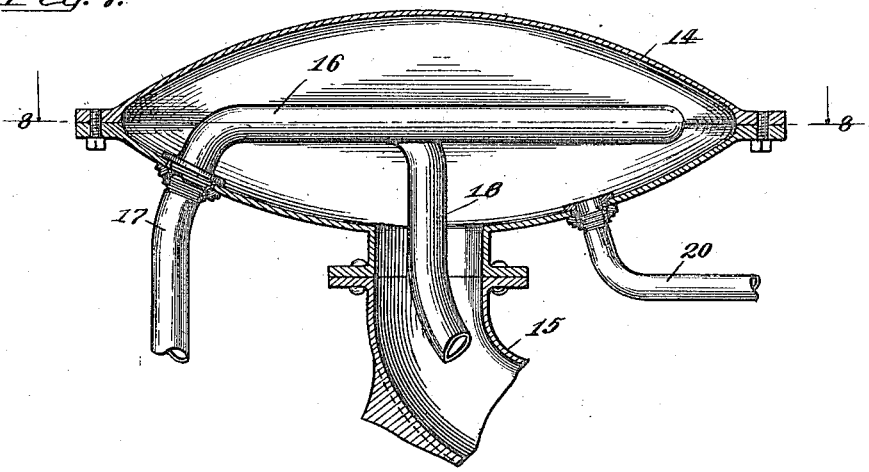
Fig. 7 is an enlarged central vertical section of the cooking coil of my device.
Figure 8:
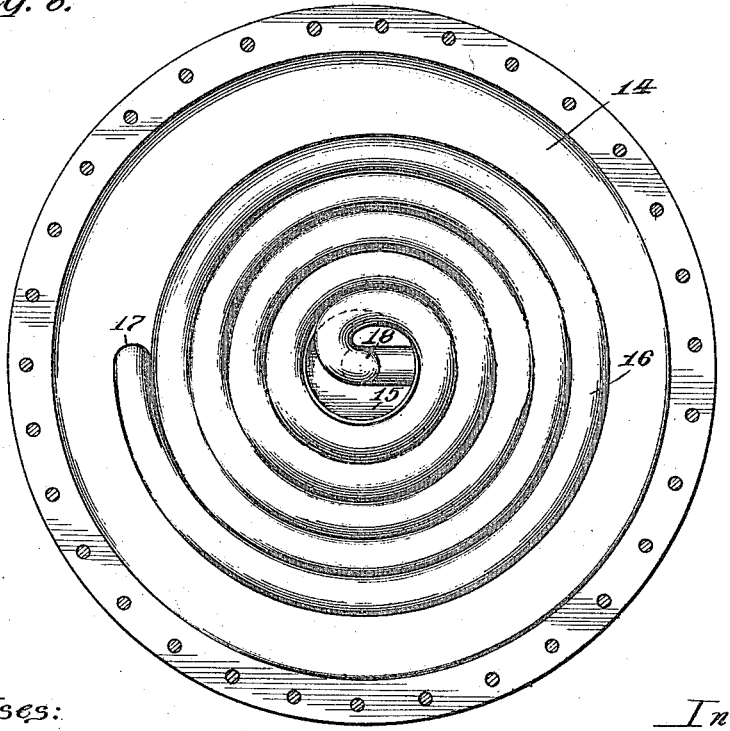
Fig. 8 is a section taken substantially on line 8—8 of Fig. 7.

In the form shown in the drawings my improved mechanism is adapted to receive various ingredients adapted to form a sugar-cream, syrup, fondant or the like in a suitable receptacle where the same may be conveniently mixed, after which the mixture is gradually operated upon, passing in a continuous stream at any desired speed through a cooker to a cooler and if desired through a beater or other device for finishing the product and discharging the material from my device as a finished product adapted for the manufacture of confections.

As shown my device consists of a suitable base-plate 1 with a plurality of posts or columns 2—3—4 and 5 rigidly secured thereto, arranged to jointly support a shelf or platform 6 at their upper ends.

In the preferred construction shown the base-plate 1 and platform 6 are substantially rectangular with the posts connecting them attached at their corners. This structure serves as the frame of my improved mechanism and the several movable parts are suitably mounted thereon.

As shown my device consists of a mixer, a feeding mechanism, a cooker, a cooler and where it is desired to further operate upon the material, a cream beater or other device adapted to receive the cooled or partially cooled material for further treatment.

In the form shown the mixer consists of a receptacle 7 preferably provided with a steam space 8 inclosing a portion of its bottom and sides arranged to operate as a jacket for heating the contents of the receptacle. A valve 9 is provided in the bottom of the receptacle so that when the material is properly mixed the valve may be opened and the material drawn off as desired; a container 10 is positioned directly below the receptacle 8 and arranged to receive the material discharged through valve 9.

In the preferred form a suitable frame comprising a band 11 extends around the receptacle 7 snugly fitting its exterior and supported by any desired number of legs or posts 12—12 to support the receptacle 7 in position and prevent displacement of the receptacle 7 and container 10 when in operation.

The cooker may be of any desired form or construction adapted to permit the continuous passage of liquid therethrough. In the form shown the cooker consists of a steam tight casing 14 provided with a depending neck or spout 15 near its center. A tubular receptacle or coil 16 is positioned within the casing 14 with its inlet end 17 projecting through the wall of the casing and its outlet end 18 extending into the depending neck 15 and provided with a nozzle 19 adapted to spread the material issuing from the coil into a broad band or film. Any suitable means may be provided for controlling the temperature of the coil 16. As shown an inlet 20 is provided for the casing 14 through which steam or other suitable heating medium may be admitted to the interior of the casing and an outlet 21 is provided upon the neck 15 so that water of condensation or other spent heating medium may escape from the casing. In the preferred construction the lower portion of the nozzle 19 is also provided with means for controlling its temperature. As shown a chamber 22 is formed in the lower wall of the nozzle 19. The outlet 21 of the casing 14 is shown connected to the chamber so that the exhaust heating medium escaping from the neck 15 will be directed into the chamber 22, whence it finally escapes through the outlet pipe 23. In the preferred construction suitable means are also provided upon the nozzle 19 to remove any steam, smoke or vapor from the material as it passes through the nozzle. In the preferred construction shown the upper surface of the nozzle 19 is curved upward as at 24 and a pipe 25 is attached to the curved portion and connected to an exhaust fan or other means (not shown) for drawing vapor from the nozzle through the pipe. Any suitable means may be provided for controlling the movement of the mixture from the container 10 to the coil 16. As shown a pump 30 is mounted upon the base-plate 1 with a suction pipe 31 extending from the pump to the bottom of the container and a discharge pipe 32 extending upward and attached to the inlet 17 of the coil 16. The pump 30 may be of any desired form or construction. As shown the pump consists of a cylinder 33 having a gland or stuffing box 34 at its upper end adapted to receive the plunger 35. A shaft 36 is mounted in suitable bearings upon the post 5 with a crank-pin 37 connected by a pair of rods 38 and 39 to the plunger 35 so that at each rotation of the shaft 36 the plunger will be partially withdrawn, and again forced into the cylinder
33. Any suitable means may be provided for controlling the stroke of the plunger 35. In the form shown a link 40 is pivotally mounted upon the post 5 as at 41 and the rod 38 is pivotally connected to the link 40 near its free end. A slot 42 is provided extending longitudinally of the link, and a block 43 is snugly fitted to the slot and adapted to move longitudinally thereof. A screw 44 engages the block and controls its position longitudinally of the slot. The rod 39 connects the block 43 and the plunger 35 and the position of the block 43 controls the length of the stroke of the plunger as it is obvious that when the block is positioned adjacent the bearing 41 the stroke of the plunger will be extremely small but when the block is at the opposite end of the slot the maximum stroke is secured.

Any suitable form of valve mechanism may be provided for my device. In the form shown a pair of valve chambers 47—47 are provided, each having a suitable partition 48 between its inlet and its outlet openings, so arranged that all fluid passing through each casing must pass through an opening 49 in the partition in that casing. A plunger 50 is accurately fitted to the openings 49 in the partition and arranged to move longitudinally. A suitable stuffing box 51 is provided to prevent leakage from the casing around the plunger. A lever 52 is pivotally mounted as at 53 on the post 5 and connected by suitable links 54—54 to the plungers, one end of the lever 52 is preferably extended and connected by a bar 55 to a rocker-arm also pivotally attached to the post 5 as at 57 and provided with an arm 58 extending into position to engage a cam 59 for controlling the position of the plungers 50. A second arm 60 may also be provided upon the lever 56 arranged to engage the cam 59 to insure the positive operation of the valves, while a spring 61 preferably extends between the free end of the rocker-arm 56 and the post 5 arranged to resiliently draw the free end of the rocker-arm downward to secure a more smooth action.

The cooler may be of any suitable form or construction adapted for continuous operation. As shown a shaft 70 is pivotally mounted in suitable bearings 71—72 upon the posts 2 and 3 respectively and a cylindrical cooling member 73 is rigidly secured to the shaft 70. The several parts are so arranged that the axis of the member 73 is substantially parallel to the face of the nozzle 19. The face or cooling surface 74 of the member 73 is preferably slightly wider than the outlet opening of the nozzle and is provided with flanges 75—76 at its margin adapted to prevent the material discharged upon the face 74 from escaping laterally. Any suitable means may be provided to maintain the face 74 of the member at a comparatively low temperature. As shown a channel 77 is provided in the member for circulating a cooling fluid therein and the shaft 70 is tubular and connected by pipes 78 and 79 to the member 73. A partition 80 is provided extending transversely of the shaft to close the opening 81 therein between the pipes 78 and 79. A partition 82 is provided in the member 73 between the pipes 78 and 79 so that a fluid forced into the inlet end of the shaft 70 will pass through the pipe 79 into the channel 77 thence entirely around the member 73 and through the pipe 78 to the opening in the shaft 70 where it escapes at the opposite end of the shaft.

Any suitable means may be provided for directing the water or other fluid into the opening in the shaft. In the form shown the bearings 71 and 72 are each provided with a chamber 83 in its outer end beyond the normal end of the shaft and with a stuffing box or gland at the inner end to prevent the escape of fluid between the shaft and the wall of the bearing. An inlet pipe 84 is attached to the bearing 72 communicating with the chamber 83 and an outlet pipe 85 is attached to the bearing 71 in a similar manner.

In the form shown the axis of the member 73 is slightly beyond the end of the nozzle 19 and suitable means are provided to prevent the material discharged from the nozzle from flowing by gravity around the member. As shown a roller 86, formed of rubber or other suitable material adapted to snugly contact with the face of the member 73 and snugly fit between its flanges, is mounted in suitable bearings 87—87 upon the platform 6 with means for resiliently holding the roller in contact with the face of the member 73. In the preferred form a resilient scraper 87 is provided adapted to engage the face of the roller 86 and prevent material from adhering to the face of the roller and interfering with its free operation.

Any suitable means may be provided for rotating the member 73. As shown a shaft 88 is mounted on suitable brackets 97 attached to the columns 2 and 3. A pair of pinions 89—89 are rigidly attached to the shaft 88 and arranged to mesh with gears 90 rigidly attached to the margins of the member 73 to rotate the member in the direction indicated in the drawings. A sprocket 91 is also rigidly mounted upon the shaft 88 and connected by a chain 92 to a sprocket 93 rigidly secured to a shaft 94 which is, in turn, driven by suitable gearing from a motor shaft 95.

Any suitable means may be provided for removing the cooled material from the surface of the member 73. As shown a scraper 96 is pivotally mounted upon the brackets 97 adapted to engage the face of the member for this purpose. An arm 98 is rigidly secured to the pivotal bearing at one end of the scraper with a spring 99 or other resilient means arranged to yieldingly press the scraper against the surface of the member; the arrangement is such that the material discharged from the nozzle 19 lies upon the cooled surface of the member 73 during slightly less than three-fourths of a rotation of the member, and when detached by the scraper falls into a suitable hopper 100 arranged to serve as the feed spout to the beater or other device 101 which may be of the usual or any preferred type and connected to the shaft 95 or other convenient means for operating the same. The finished material may be discharged from the beater or other device in the usual or any preferred form.

In the preferred construction suitable means are provided to thoroughly clean the surface of the cooling member 73 before a fresh charge of the cooked material is deposited upon it; for this purpose a rotatable brush 102 is mounted upon the brackets 97 and provided with movable bearings adapted to be adjusted to and from the member 73 by suitable screws 103 or other convenient means so that the bristles of the brush may be brought into contact with the member 73 with any desired force. A tube 104 having suitable perforations for directing water or other fluid against the face of the member 73 is provided in close proximity to the brush to wet the surface of the member and thereby render the scrubbing action of the brush more effective. As shown also a casing 105 is provided inclosing the brush 102 and having a drain pipe 106 attached to its lower side to discharge the fluid carried into the casing 105. Suitable means are also provided for removing moisture or drying the surface of the member 73 after the same has been scrubbed. For this purpose a strip of felt, rubber or other suitable material 107 of suitable length to extend across the face of the member is rigidly held by a suitable clamp or holder 108 mounted upon the casing 105 to press against the surface of the member 73 and remove the fluid which may be adhering thereto, thus leaving the surface of the member clean and dry and in condition to receive a fresh charge from the nozzle 19.

Any suitable means may be provided to drive the shaft 36. In the form shown a shaft 110 is provided extending from the shaft 36 to the shaft 94 with a pair of bevel gears 111 connecting the shaft 110 to the shaft 36 and a pair of bevel gears 112 connecting the shaft 110 to the shaft 94 so that rotation of the shaft 94 will produce a corresponding rotation of the shaft 36.

Having thus described my improvement it is obvious that various immaterial modifications may be made in my device without departing from the spirit of my invention; hence I do not wish to be understood as limiting myself to the exact form or construction shown.

What I claim as new and desire to secure by Letters Patent is:

1. In a device of the kind described, a mixer, a receiver, a tubular cooker open at both ends and a cooler, in combination with means permanently connecting said receiver to one end of said cooker for continuously directing fluid from said receiver to the cooker, said cooker having a fixed trough-like portion at its opposite end for directing material from said cooker to the cooler.

2. In a device of the kind described, a mixer, a receiver, a tubular cooker open at both ends and a rotatable cooler, in combination with means for continuously directing fluid from said receiver through said cooker to the cooler, said cooker having a trough like portion at its discharge end for directing the cooked material to said cooler.

3. In a device of the kind described, a mixer, a receiver, a tubular cooker open at both ends and a rotatable cooler, in combination with means for continuously directing fluid from said receiver through said cooker to the cooler, said cooker having a trough-like portion at its discharge end for maintaining the temperature of the cooked material and discharging the same to said cooler, and means for controlling the movement of fluid through said cooker.

4. In a device of the kind described, a mixer, a receiver, a tubular cooker open at both ends and a rotatable cooler, in combination with means for permanently connecting said receiver and cooker for directing fluid from said receiver through said cooker to the cooler, means for controlling the movement of fluid through said cooker, and means for continuously removing the cooled material from said cooler.

5. In a device of the kind described, a mixer, a receiver, a tubular cooker open at both ends and a rotatable cooler, in combination with means for directing fluid from said receiver through said cooker to the cooler, said cooker having a trough-like portion at its discharge end for maintaining the temperature of the cooked material and discharging the same to said cooler, means for controlling the movement of fluid through said cooker and means for continuously removing the material from said cooler.

6. In a device of the kind described, a mixer, a receiver, a tubular cooker open at both ends and a cooler, in combination with means for directing fluid from said receiver through said cooker to the cooler, means for controlling the movement of fluid through said cooker, means for continuously removing the material from said cooler, and means for preparing the surface of said cooler as soon as the cooled material is removed therefrom for receiving another charge of said material.

7. In a device of the kind described, a mixer, a receiver, a tubular cooker open at both ends and a rotatable cooler, in combination with means for directing fluid from said receiver through said cooker to the cooler, means for continuously removing the cooled material from said cooler, and means for preparing the surface of said cooler as soon as the cooled material is removed therefrom for receiving another charge of said material.

8. In a device of the kind described, a mixer, a receiver, a tubular cooker open at both ends and a cooler, in combination with means for directing fluid from said receiver through said cooker to the cooler, said cooker having a trough-like portion at its discharge end for maintaining the temperature of the cooked material and discharging the same to said cooler, and means for controlling the movement of fluid through said cooker.

9. In a device of the kind described, a mixer, a receiver, a tubular cooker open at both ends and a cooler, in combination with means for directing fluid from said receiver through said cooker to the cooler, said cooker having a trough-like portion at its discharge end for maintaining the temperature of the cooked material and discharging the same to said cooler, means for continuously removing the cooled material from said cooler, and means for preparing the surface of said cooler as soon as the cooled material is removed therefrom for receiving another charge of said material.

10. In a device of the kind described, a mixer, a receiver, a cooker and a cooler, in combination with means permanently connecting said receiver and said cooker for directing fluid from said receiver to the cooker and cooler, means for continuously removing the material from said cooler, and means for preparing the surface of said cooler as soon as the cooled material is removed therefrom for receiving another charge of said material.

In testimony whereof, I have hereunto signed my name in the presence of two subscribing witnesses.

JOHN T. HOHBERGER.

Witnesses:
BLANCHE CHALMERS,
BURTON U. HILLS.